United States Patent Office 3,466,337
Patented Sept. 9, 1969

3,466,337
REGENERATION OF PHENOL FROM BISPHENOL A AND BYPRODUCTS
William E. Smith and Fred W. Neumann, Midland, Mich., assignors to The Dow Chemical Company, Midland, Mich., a corporation of Delaware
No Drawing. Filed Jan. 30, 1967, Ser. No. 612,365
Int. Cl. C07c 37/00
U.S. Cl. 260—621  3 Claims

ABSTRACT OF THE DISCLOSURE

Bisphenol A and isomers and byproducts obtained in its preparation are decomposed by heating with an acid to form phenol and other products. By distilling phenol from the reaction mixture substantially as it is formed, up to about 1.5 moles of phenol per mole of bisphenol A or equivalent thereof can be obtained.

BACKGROUND OF THE INVENTION

The present invention relates to an improved method whereby increased yields of phenol are obtained from the acid-catalyzed decomposition of 4,4'-isopropylidenediphenol and isomers and byproducts formed during its preparation.

During the preparation of 4,4'-isopropylidenediphenol ,bisphenol A), commonly by the acid-catalyzed reaction of phenol with acetone, other isopropylidenediphenols such as the 2,4'-isomeric compound and other byproducts are formed in small but appreciable quantities. In the course of the preparation, separation, and purification of the bulk of the desired product from the reaction mixture, there may also be formed secondary products such as polymers and reaction products of isopropenylphenol, Dianin's compound (p-(2,2,4-trimethyl-4-chromanyl)-phenol), and related compounds. These isomers, byproducts, and secondary products, together with a quantity of bisphenol A itself, constitute waste fractions for which there is no real use and which represent a considerable loss of phenol. Bisphenol A and its 2,4'-isomer are the major constituents of this waste material.

It is known that bisphenol A can be decomposed by heat alone or, more readily, by heat in the presence of either an alkali or an acid. Decomposition by hydrolysis with aqueous alkali reverses the preparative reaction and yields two moles of phenol and one of acetone per mole of bisphenol. However, the number of steps and the quantities of reactants required make this method economically impractical for recovery of phenol from waste bisphenol A. The acid-induced decomposition of bisphenol A to phenol and p-isopropenylphenol has the advantage of requiring only a catalytic quantity of acid. However, the prior art teaches that only one mole of phenol is liberated per mole of bisphenol A, the rest of the bisphenol molecule ending up as p-isopropenylphenol or a resinous polymer or reaction product of that compound. Therefore, only half of the starting phenol would be expected to be recoverable by this reaction.

SUMMARY OF THE INVENTION

It has now been found that not only bisphenol A itself, but also the various isomers, byproducts, and secondary products as described above are decomposed by heating with an acid at 125–300° C. to liberate phenol and it has been found further that by continued heating, up to about 1.5 moles of phenol are obtainable per mole of bisphenol A or equivalent thereof. This result is produced by heating the acidified bisphenol A or waste product concentrate within the specified temperature range at a reduced pressure below 200 mm. such that the liberated phenol is distilled or flashed from the mixture substantially as it forms while the less volatile materials such as isopropenylphenol are maintained in the reaction mixture by suitable reflux return means, and the process is continued in this way until evolution of phenol has substantially ceased. At least about 1.2 moles, usually 1.3–1.5 moles of phenol are thereby obtained per mole of bisphenol A or equivalent thereof.

By an equivalent of bisphenol A is meant that number of moles of isomer, byproduct, or secondary product which liberate the same amount of phenol by the present process as a mole of bisphenol A. For example, a mole of the 2,4'-isomer obviously is one equivalent. Isopropenylphenol and phenol are the two molecules produced by acid decomposition of bisphenol A. Since 1.5 moles of phenol are derivable from a mole of bisphenol A, isopropenylphenol is equivalent to the bisphenol less one mole of phenol and so is a third of an equivalent. Similarly, the dimer of isopropenylphenol is two-thirds of an equivalent and trisphenol, the product obtained by condensing a molecule of isopropenylphenol with a molecule of bisphenol, is one and one-third equivalents. In the same way, Dianin's compound and 1,1,3-trimethyl-3-(p-hydroxyphenyl)-5-indanol each represent two-thirds of an equivalent, for each can be considered a dimer of p-isopropenylphenol.

DETAILED DESCRIPTION

While any acidic material will facilitate the thermal decomposition of bisphenol A and related products as defined above, for obvious reasons a strong acid which is essentially non-volatile under process conditions is preferred. Acids such as benzenesulfonic acid, toluenesulfonic acid, sodium hydrogen sulfate, phosphoric acid, benzenephosphonic acid, and related acids are included. The quantity of acid is not critical, but concentrations of 0.1–20 percent by weight of the bisphenol A product material is conveniently used.

The pressure in the reaction system is essentially defined by the vapor pressure of phenol and isopropenylphenol at the process temperatures. Normally, the decomposition is carried out at a starting pressure of 50–200 mm. and a starting temperature of 125–150° C. while the final pressure may be reduced to 1 mm. as the temperature is increased to a maximum of 250–300° C.

The residue from this process is a resinous material which has a condensed polyphenolic molecular structure. It is an effective antioxidant and stabilizer which is essentially non-volatile and highly compatible with many polymeric compositions. It is a valuable additive to prevent oxidative degradation of polyolefins and natural and synthetic rubber.

This process, therefore, provides a means for converting to useful products essentially all of low grade bisphenol A fractions, bisphenol A byproducts, and related materials which would otherwise be largely discarded as wastes. Best results are obtained and the process is most valuable when applied to recovery of phenol from crude bisphenol A or residues from the crystallization of bisphenol A which are largely bisphenol A itself and its 2,4'-isomer. The phenol which is recovered has a purity of about 95% or better and so is suitable for use for many purposes without an added purification. It can be converted to phenol of 99% or better quality by a simple fractional distillation if desired.

EXAMPLE 1

A mixture of 1 kg. of 4,4'-isopropylidenediphenol and 4 g. of p-toluenesulfonic acid was heated in a flask connected to a distillation column with a fractional take-off head. The pressure in the system was initially maintained at 100 mm. As the bisphenol melted, decomposition began at a pot temperature of 145–150° C. and phenol started to distill through the column. Heating and distillation of phenol was continued until 581.7 g. of phenol had been collected with a system pressure of 60 mm. and a pot temperature of 232° C. at this point. The temperature of the reaction mixture was then increased to 269° C. while the pressure was further reduced to a final value of 5 mm., thereby distilling from the mixture an additional quantity of 65.3 g. of impure phenol. This second fraction was yellow and was found to contain 65% by weight of phenol. The first fraction was colorless and was found by analysis to be phenol of 99% purity. Total phenol separated was 624.1 g. or 6.63 gram moles. This represents 1.51 g. moles of phenol from one mole of bisphenol.

EXAMPLE 2

Acetone was reacted with excess phenol saturated with hydrogen chloride. The reaction mixture was cooled to crystallize most of the 4,4'-isopropylidene-diphenol which was collected by filtration; and the mother liquor thereby obtained was distilled to remove phenol and more volatile substances. The distillation residue was largely 4,4'-isopropylidenediphenol and its 2,4'-isomer with minor proportions of other byproducts such as Dianin's compound, 4,4' - (4 - hydroxy-m-phenylenediisopropylidene)diphenol and similar compounds.

A mixture of 978 g. of this residue with 4 g. of p-toluenesulfonic acid was heated as described in Example 1. With a system pressure from an initial 100 mm. to a final 9 mm. and a final pot temperature of 250° C., a total of 538 g. of phenol of better than 95% purity was distilled from the mixture. This represents a ratio of 1.34 moles of phenol per mole of residue, calculating the residue as if all bisphenol.

EXAMPLE 3

Following the general procedure of Example 1, a mixture of 2,4'-isopropylidenediphenol and p-toluene-sulfonic acid is heated under reduced pressure to obtain distilled phenol in similar proportions. In this case, decomposition of the bisphenol and distillation of liberated phenol begins at about 130° C.

By the procedure of the above examples, other individual byproducts and secondary byproducts obtained in the preparation of 4,4'-isopropylidenediphenol were heated with p-toluenesulfonic acid at temperatures above 125° C. and at reduced pressures to provide the rapid distillation of liberated phenol. In each case, a substantial quantity of phenol was obtained. The byproduct compounds thereby treated included p-isopropenylphenol and its linear dimer, Dianin's compound, 1,1,3-trimethyl-3-(p-hydroxyphenyl)-5-indanol, and 4,4'-(4-hydroxy-m-phenylenediisopropylidene)diphenol. Representative experimental results from these small scale reactions include the production and isolation of 0.66 mole of phenol per mole of linear dimer of p-isopropenylphenol, 1.23 moles of phenol per mole of trisphenol, 0.64 mole of phenol per mole of Dianin's compound, and 0.7 mole of phenol per mole of 1,1,3-trimethyl-3-(p-hydroxyphenyl)-5-indanol. Quantities of phenol closer to the theoretical yields are obtained from these compounds by the more efficient operation on a larger scale.

Results similar to those shown in the above examples are obtained when sulfuric acid, phosphoric acid, or other such acid as previously defined is used in place of toluenesulfonic acid in the described process.

We claim:
1. A process which comprises heating isopropylidene diphenol with acid at a starting pressure of 50 to 200 mm. and a starting temperature of 125° to 150° C. and then reducing the pressure to below 200 mm. while increasing the temperature to 250° to 300° C. and distilling phenol from the decomposing mixture substantially as it forms while returning vaporized material less volatile than phenol to the decomposing mixture.
2. The process of claim 1 wherein the acid is essentially non-volatile under the process conditions.
3. The process of claim 1 wherein the isopropylidene diphenol is a residue fraction comprising 4,4'-isopropylidene diphenol and 2,4'-isopropylidenediphenol as major constituents being prepared by reacting acetone and phenol to make an isopropylidenediphenol reaction mixture which is cooled to crystallize most of the 4,4'-isopropylidenediphenol which is collected by filtration to give a mother liquor which is distilled to remove phenol and more volatile substances and give said residue fraction.

References Cited
UNITED STATES PATENTS

| 1,798,813 | 3/1931 | Schoeller et al. |
| 1,816,286 | 7/1931 | Jordan. |
| 2,191,831 | 2/1940 | Perkins. |
| 2,979,534 | 4/1961 | Petropoulos et al. |
| 3,049,569 | 8/1962 | Apel et al. |
| 3,075,015 | 1/1963 | Meyer et al. |
| 3,271,463 | 9/1966 | Howard. |

FOREIGN PATENTS

| 905,994 | 9/1962 | Great Britain. |

LEON ZITVER, Primary Examiner

J. E. EVANS, Assistant Examiner

U.S. Cl. X.R.

252—399; 260—45.7, 345.2, 799, 814